United States Patent [19]

Launder

[11] 3,733,722
[45] May 22, 1973

[54] DUAL DIGGING TOOTH RETAINER

[76] Inventor: Richard L. Launder, 1540 South Greenwood Avenue, Whittier, Calif. 90640

[22] Filed: June 9, 1971

[21] Appl. No.: 151,454

Related U.S. Application Data

[63] Continuation-in-part of Ser. No. 84,974, Nov. 12, 1970, abandoned.

[52] U.S. Cl. ................... 37/142 A, 172/713, 29/253
[51] Int. Cl. ............................................. E02f 9/28
[58] Field of Search ....................... 37/142; 172/713

[56] References Cited

UNITED STATES PATENTS

| | | | |
|---|---|---|---|
| 2,702,490 | 2/1955 | Launder | 37/142 A X |
| 2,798,403 | 7/1957 | Launder | 37/142 R X |
| 3,601,911 | 8/1971 | Wood | 37/142 R |
| 3,650,053 | 3/1972 | Baer | 37/142 A |

*Primary Examiner*—Robert E. Pulfrey
*Assistant Examiner*—Clifford D. Crowder
*Attorney*—Lyon & Lyon

[57] ABSTRACT

Dual retainer pins for a digging tooth, forming a socket having opposed holes in its sidewalls and arranged to fit over a mating holder having a cross bore positioned ta align with the opposed holes; each of the dual retainer pins comprizing a pair of complementary bars joined by a rubber body so that the bars may be compressed toward each other, and the pair of pins dimensioned to be disposed in the holder with their inner ends in abuttment and their extended ends projecting into the holes in the sidewalls of the tooth so that localized force is applied adjacent their extended ends tending to cause the pins to assume wedge shapes by causing their extended ends to compress and their abutting ends to expand. Also contemplated is a removing tool insertable between closely spaced teeth and including a wedge element operated driving pin engageable with one retainer pin to force the other pin free while placing the first pin wholly within the bore of the holder.

3 Claims, 7 Drawing Figures

INVENTOR.
RICHARD L. LAUNDER
BY
Lyon & Lyon
ATTORNEYS

DUAL DIGGING TOOTH RETAINER

This application is a continuation-in-part of my previous application, Ser. No. 84,974, filed Nov. 12, 1970, for "Removable Digging Tooth and Removable Tool Therefor" now abandoned.

BACKGROUND OF THE INVENTION

Digging teeth such as used on power operated shovels and other digging equipment are, by the nature of their use, subjected to extreme wear to the extent that the removing teeth are used extensively. This, in turn, has required the development of special retainer pins which secure the teeth against accidental dislodgement, yet permit removal when desired. Particularly successful retaining pins are disclosed in U.S. Pat. No. 3,277,592 and U.S. Pat. No. 2,716,822.

Heretofore, in order to install and remove pins of this type, it has been necessary to space the teeth a distance at least equal to the width of the teeth; whereas, if it were possible it would be desirable to space the teeth about half this distance to improve the digging action. One solution has been to position the retainer pins vertically rather than horizontally. While this permits the desired close spacing of the teeth, this solution poses a severe problem for the upper end is exposed to pressures applied to the top of the tooth. The earth or other material loosened and lifted by the tooth tends to pack into the hole in which the retainer pin is received. This is a cumulative effect which tends to drive the pin downward. As the lower end protrudes it is worn off or is broken. In contrast, a horizontally extending pin is not subject to forces which would cause dislodgement.

SUMMARY OF THE INVENTION

The present invention is directed to a removable digging tooth and removing tool which permits close spacing of a series of digging teeth and is summarized in the following objects:

First, to provide dual retainer pins for use with a digging tooth having a socket provided with opposed holes and a mating bore for alignment with the holes, each dual retainer pin being half the combined length of the bore and holes, and transversely compressible, whereby upon placing the dual retainer pins in abutment within the bore, their ends extend into the holes and are compressed adjacent their ends in the planes between the confronting surfaces of the socket and the holder to force the retainer pins into a wedge shape with their larger ends within the holder and their smaller ends in the holes, whereby opposing forces are generated urging the retainer pins toward their abutting relation and preventing loss of either retainer pin.

Second, to provide dual retainer pins for digging teeth, as indicated in the preceding object, whereby one retainer pin may be driven free leaving the remaining pin within the holder and clear of the removable tooth, yet available when a tooth is again fitted on the holder, to be driven into retaining position by a second retainer pin when forced into the end of the holder bore through one of the aligned holes.

Third, to provide a removing tool which cooperates with the pair of retainer pins indicated in the preceding objects to effect removal of a retainer pin thereby to permit removal of the digging tooth.

Fourth, to provide a removing tool, as indicated in the preceding object, wherein a mounting frame is adapted to dispose a drive pin in alignment with the retainer pin bore and is provided with slots positioned to receive a vertically operable wedge to force the drive pin against one retainer pin thereby to drive the other wedge pin free.

Figure 1:
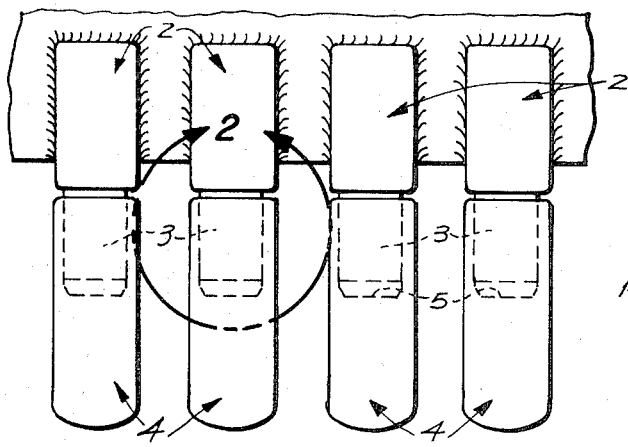
FIG. 1 is a fragmentary top view showing a series of digging teeth attached to a digging structure shown fragmentarily.
Figure 3:
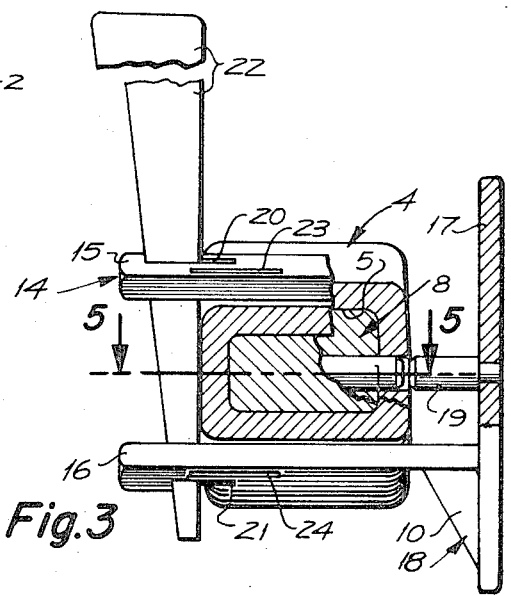
FIG. 3 is a transverse sectional view thereof, taken through 3—3 of FIG. 2, also showing the removing tool in its position at the beginning of the retainer pin removing operation.
Figure 2:
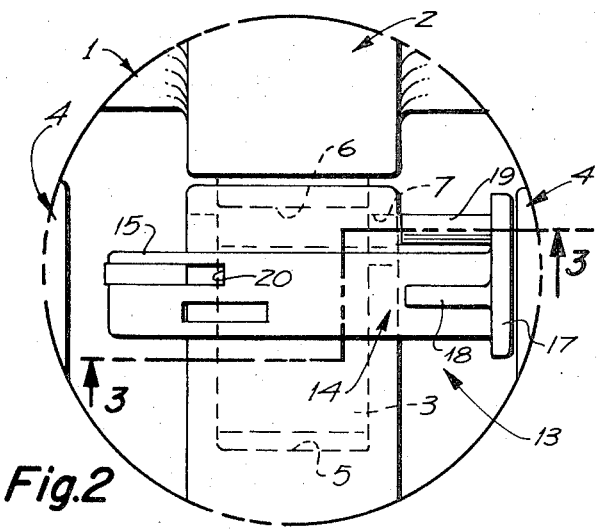
FIG. 2 is an enlarged fragmentary plan view taken within Circle 2 of FIG. 1, showing the removing tool in position at the start of the retainer pin removing operation.
Figure 4:
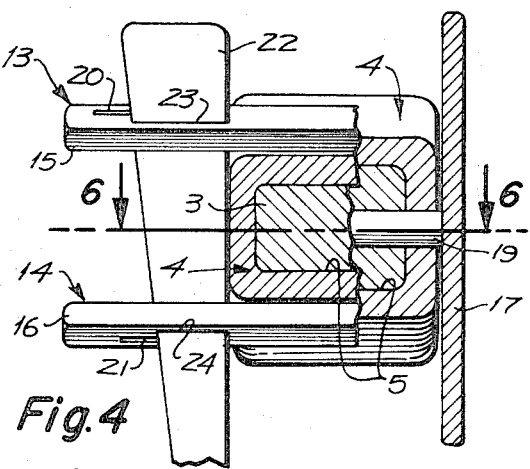
FIG. 4 is a sectional view, similar to FIG. 3, showing the removing tool on completion of the retainer pin removing operation.

A digging structure 1 on which digging teeth are mounted may be a power shovel or other structure intended to be forced into the earth or other solid body. The digging edge of the digging structure is provided with a row of digging tooth holders 2, having tapered extremities 3. The upper and lower surfaces of the extremities converge, whereas the sides thereof are essentially parallel.

Each holder 2 receives a digging tooth 4, having a tapered socket 5, which matches the tapered extremity 3. Each tapered extremity 3 is provided with a horizontal or transverse retainer pin bore 6, and the side walls of the tapered socket 5 are provided with retainer pin holes 7, which register with the bore 6. The structure thus far described is conventional.

In the exercise of the present invention, the bore 6 and holes 7 receive a pair of retainer pins 8. Each retainer pin includes a pair of complementary members 9 bonded to opposite sides of an elastomeric spacer 10 so that the retainer pins are transversely compressible. The extremities of the complementary members 9 are offset, as indicated by 11, to form shoulders 12, as shown in FIGS. 5 and 6; or, the shoulders may be omitted, as shown in FIG. 7.

The combined lengths of the pair of retainer pins 8 are approximately equal to the width of the digging tooth 4 so that their remote offset ends 11 may be received in the holes 7, whereas, the remaining portions of the retainer pins are received in the retainer pin bore 6 of the tooth holder, with their ends in abuttment.

Figure 5:
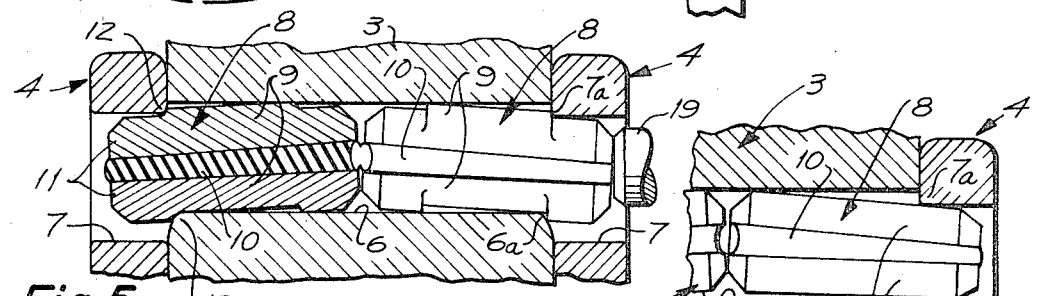
FIG. 5 is a further enlarged fragmentary sectional view, taken through 5—5 of FIG. 3, showing particularly the retainer pins in their initial position.
Figure 7:
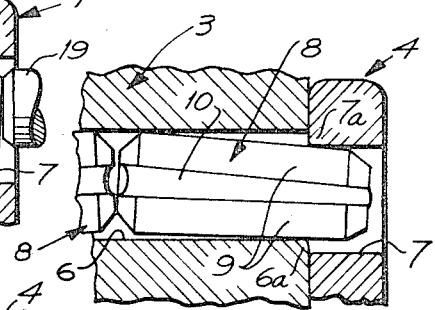
FIG. 7 is a fragmentary sectional view, corresponding to FIG. 6, showing a modified retainer pin.
Figure 6:
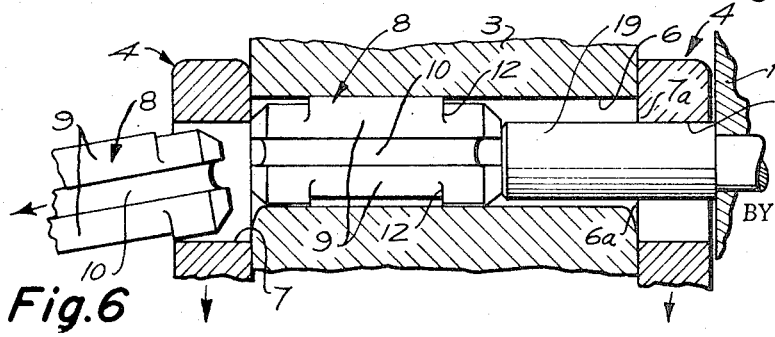
FIG. 6 is a similar enlarged fragmentary sectional view, taken through 6—6 of FIG. 4, showing one of the retainer pins as it is driven free.

As indicated in FIGS. 5 and 7, the bore 6 and holes 7 are not in complete alignment and the width of the retainer pins taken through the spacer 10 is less than the distance between the opposing corners 6a and 7a of the bore 6 and hole 7. Consequently, localized transverse pressure is applied to each retainer pin between the corners, causing the outer end to compress diametrically and the inner end to expand diametrically so that the retainer pin becomes wedge shaped.

As a result, a force is created which tends to work each retainer pin into the holder bore; however, this force is balanced by the opposing force of the other abutting retainer pin.

While the shoulders 12 are not needed to maintain the retainer pins in position, they are employed as a redundant or backup protection against loss of a retainer pin and resist excessive inward movement of either retainer pin, for, as indicated in FIG. 5, the shoulders bear against the corners 6a and 7a and require further compression of the spacer 10 in order for the retainer pin to move further into the bore 6. This further movement is necessary in order to remove the tooth. This is accomplished by driving one retainer pin into the bore 6, forcing the other retainer pin out, as shown in FIG. 6. As indicated, the retainer pins have less axial length than the bore 6, so that either retainer pin may remain in the bore 6.

When a new digging tooth is replaced on the tapered extremity 3, the second retainer pin is inserted in either hole 7 and driven into place. This operation is accomplished by conventional means, which includes a clamping tool adapted to grasp one end portion of the retainer pin and compress the spacer 10 to permit relatively free insertion of the retainer pin half way so as to enter an end of the bore 6, whereupon a drive wedge prying tool or offset drive pin is used to force the second retainer pin until the dual retainer pins are in the position shown in FIG. 5.

The insertion of the retainer pins may be readily accomplished even though the teeth are positioned close together; that is, the spacing between the teeth need be only slightly greater than the length of the retainer pin in order to accomplish the assembly operation; that is, only slightly more than one-half the width of the tooth 4. However, such close spacing made possible by the dual retainer pins posed a severe problem concerning removal of the tooth. This problem has been solved by the driving tool or pin removing tool, indicated generally by 13. The driving tool includes a frame 14, having an upper bar 15 and a lower bar 16, joined at one end by a vertical plate 17, reinforced by angle braces 18. The vertical plate is provided with a drive pin 19, dimensioned to fit freely in the bore 6 and holes 7.

The frame 14 is dimensioned to fit over a digging tooth to the vertical plate 17 between adjacent digging teeth and the drive pin 19 aligned with a hole 7. The bars 15 and 16 converge laterally to conform to the upper and lower sides of the digging tooth. The vertical plate is wider than the bars 15 and 16 so as to position the drive pin 19 in alignment with a hole 7 when the bars 15 and 16 are in slidable engagement with the surfaces of the digging tooth.

The upper and lower bars 15 and 16 are provided with a first set of wedge slots 20 and 21, respectively, portions of which overlie and underlie the digging tooth while the remaining portions extend laterally beyond the digging tooth so as to receive the lower end of a wedge bar 22 disposed in a vertical position alongside the digging tooth. By driving downward on the wedge bar 22, the drive pin 19 is forced into the bore 7.

In order to permit the use of relatively short wedge bar 22, a second pair of wedge slots 23 and 24 are provided which become accessible to the wedge bar when the wedge bar is driven its full distance into the slots 20 and 21. The second set of slots 23 and 24 permit the drive pin 19 to be driven its full depth into a hole 7 and corresponding bore 6. The length of the drive pin 19 is such that when driven its full depth, one of the retainer pins 8 is driven from the bore 6 and is easily removed from the adjacent hole 7, as indicated in FIG. 6.

While particular embodiments of this invention have been shown and described, it is not intended with limit the same to the details of the constructions set forth, but instead, the invention embraces such changes, modifications and equivalents of the various parts and their relationships as come within the purview of the appended claims.

I claim:

1. A removable tooth structure, comprising:
   a. a digging tooth provided with a socket having aligned holes in opposite walls;
   b. a holder, said socket embracing said holder and having a bore generally aligned with the holes, the juncture between said bore and holes having a diameter less than the diameter of said bore;
   c. and dual retainer pins, each of said dual retainer pins including:
      a pair of bar members, equal in length to approximately half the combined length of the holder bore and tooth holes;
      a distortable elastomeric spacer disposed between and bonded to the bar members to permit diametrical compression of the retainer pin into a wedge configuration;
      the retainer pins being disposed in abutting relation at the center of the holder bore, having extended portions projecting through said junctures into the tooth holes and diametrically compressed at the junctures between the holder and walls of the tooth socket to cause the retainer pins to assume a wedge configuration with their abutting ends being their larger ends, thereby producing a force tending to move the pins toward each other.

2. A removable digging tooth structure, comprising:
   a. a support having a plurality of side-by-side holders, each holder including converging upper and lower surfaces and essentially parallel side surfaces, and each having a transverse bore extending between the side surfaces;
   b. a plurality of removable teeth, each having a socket embracing a corresponding holder and having opposed side walls and holes in the walls generally aligned with the bore in the corresponding holder, the spacing between the sides of adjacent teeth being of the order of one-half the width of the tooth;
   c. and a pair of retainer pins occupying the holes and the bores of each tooth, the combined length of each pair of retainer pins being substantially the same as the width of a tooth, whereby, the retainer pins are in end abutment within the bore, the extended ends of the retainer pins projecting into the holes in the tooth to secure the tooth on its holder; the length of each retainer pin being less than the width of the holder and no greater than one-half the width of a tooth to permit removal of a worn tooth by driving only one retainer pin from the bore into the space between adjacent teeth and leaving the other retainer pin within the holder.

3. A removable digging tooth structure, as defined in claim 2, wherein:

a. each retainer pin includes a pair of bars and a distortable elastomer bonded between the bars, each retainer pin being capable of diametrical compression adjacent an end to cause the pin to assume a wedge configuration when compressed at the interface between an end of the holder bore and the adjacent tooth hole.

* * * * *